United States Patent [19]

Pirolli et al.

[11] Patent Number: 5,895,470
[45] Date of Patent: Apr. 20, 1999

[54] SYSTEM FOR CATEGORIZING DOCUMENTS IN A LINKED COLLECTION OF DOCUMENTS

[75] Inventors: Peter L. Pirolli, El Cerrito; James E. Pitkow, Palo Alto; Ramana B. Rao, San Francisco, all of Calif.

[73] Assignee: Xerox Corporation, Stamford, Conn.

[21] Appl. No.: 08/842,926

[22] Filed: Apr. 9, 1997

[51] Int. Cl.$^6$ ........................................................ G06F 17/30
[52] U.S. Cl. .................... 707/102; 707/4; 707/101; 707/103; 707/5; 707/6; 707/104
[58] Field of Search ........................ 707/4, 101, 103, 707/5, 6, 102, 104

[56] References Cited

U.S. PATENT DOCUMENTS

| | | | |
|---|---|---|---|
| 5,193,185 | 3/1993 | Lanter | 707/101 |
| 5,418,948 | 5/1995 | Turtle | 707/4 |
| 5,442,778 | 8/1995 | Pedersen et al. | 707/5 |
| 5,687,364 | 11/1997 | Saund et al. | 707/5 |
| 5,754,939 | 5/1998 | Herz et al. | 455/4.2 |
| 5,758,347 | 5/1998 | Lo et al. | 707/103 |
| 5,778,368 | 7/1998 | Hogan et al. | 707/10 |

FOREIGN PATENT DOCUMENTS

| | | | |
|---|---|---|---|
| 0632367 A1 | 1/1995 | European Pat. Off. | 3/6 |
| 2318479 | 4/1998 | United Kingdom | 12/23 |

OTHER PUBLICATIONS

Classification and Indexing Languages in Poland (1974–1986), Int. Classification, V 14, No. 1., pp. 23–28, Bielicka et al., Int, Jul. 1987.

The Use of Cluster Hierarchies in Hypertext Information Retrieval, Crouch et al., Hypertext '89 Proceedings, pp. 225–237, Nov. 1989.

Do We Need a Common Standard for the Design Structure Model?, Siepmann, Electronic Design Automation Frameworks, Elsevier Science Publishers—North Holland, IFIP 1991, pp. 349–364, Jan. 1991.

Self–documenting systems: a role for machine–aided indexing, Griffiths, The University of Tennesse, USA, Online Information 92, Dec. 8–10, 1992 London, England, pp. 291–296, Aug. 1992.

IN Search of Meta–knowledge, Lopez, Jr., Mathematical Sciences, Loyola University, email: lopez@loynovm.bitnet, pp. 263–269, N93–25983, May 1993.

Creating a Web Analysis and Visualization Environment, Kent et al., Consumer Networks and ISDN Systems, pp. 109–117 vol. 28, Jul. 1995.

Search and Ranking Algorithms for Locating Resources on the World Wide Web, Yuwono et al., 1996 IEEE, pp. 164–171, Feb. 1996.

Primary Examiner—Wayne Amsbury
Assistant Examiner—Shahid Alam
Attorney, Agent, or Firm—Richard B. Domingo

[57] ABSTRACT

A system for extracting and analyzing information from a collection of linked documents at a locality to enable categorization of documents and prediction of documents relevant to a focus document. The system obtains and analyzes topology, usage and path information from for a collection at a locality, e.g. a web locality on the world wide web. For categorization, document meta information is represented as document vectors. Predefined criteria is applied to the document vectors to create lists of "similar" types of documents. For relevance prediction, networks representing topology, usage path and text similarity amongst the documents in the collection are created. A spreading activation technique is applied to the networks starting at a focus document to predict the documents relevant to the focus document. Using category and relevance prediction information, tools can be built to enable a user to more efficiently traverse through the collection of linked documents.

14 Claims, 10 Drawing Sheets

| Page Identifier | Size (Bytes) | Inlinks | Outlinks | Frequency | Sources | CSIM | CDEPTH |
|---|---|---|---|---|---|---|---|
| Page 1 | 500 | 8 | 7 | 113 | 105 | 95 | 5 |
| Page 2 | 1500 | 2 | 3 | 45 | 0 | 56 | 31 |
| Page 3 | 460 | -5 | 5 | 16 | 3 | 38 | 2 |
| Page 4 | 1200 | 4 | 3 | 78 | 56 | 77 | 2 |
| Page 5 | 479 | 1 | 2 | 23 | 20 | 69 | 3 |
| Page 6 | 2267 | 6 | 5 | 100 | 77 | 98 | 2 |
| Page 7 | 3397 | 3 | 2 | 90 | 2 | 76 | 1 |
| Page 8 | 6501 | 1 | 1 | 88 | 0 | 0 | 0 |

*FIG. 5*

| Page Category | Size | Number Inlinks | Number Outlinks | Depth of Children | Similarity to Children | Frequency | Entry Point |
|---|---|---|---|---|---|---|---|
| Index | (outlinks /size) | 0 | +1 | 0 | 0 | 0 | 0 |
| Source Index | (outlinks /size) | 0 | +1 | 0 | 0 | 0 | +1 |
| Reference | +1 | -1 | -1 | -1 | 0 | 0 | 0 |
| Destination Reference | +1 | -1 | -1 | -1 | 0 | 0 | -1 |
| Head | 0 | 0 | +1 | +1 | +1 | 0 | +1 |
| Organization Home Page | 0 | +1 | +1 | 0 | +1 | 0 | +1 |
| Personal Home Page | >1000k <3000k | 0 | 0 | 0 | 0 | -1 | -1 |
| Content | +1 | -1 | -1 | 0 | 0 | 0 | 0 |

*FIG. 6*

SYSTEM FOR CATEGORIZING DOCUMENTS IN A LINKED COLLECTION OF DOCUMENTS

CROSS REFERENCE TO RELATED APPLICATIONS

The present application is related to commonly assigned U.S. patent application Ser. No. 08/836,807 entitled "System For Predicting Documents Relevant To Focus Documents By Spreading Activation Through Network Representations Of A Linked Collection Of Documents" U.S. Pat. No. 5,835,905 which was filed concurrently with the present application.

FIELD OF THE INVENTION

The present invention is related to the field of analysis and design of linked collections of documents, and in particular to categorization of documents in said collection.

BACKGROUND OF THE INVENTION

Users of large linked collections of documents, for instance as manifest on the World Wide Web, are motivated to improve the rate at which they gain information needed to accomplish their goals. Hypertext structures primarily affords information seeking by the sluggish process of browsing from one document to another along hypertext links. This sluggishness can be at least partly attributed to three sources of inefficiency in the basic process. First, basic hypertext browsing entails slow sequential search by a user through a document collection. Second, important information about the kinds of documents and content contained in the total collection cannot be immediately and simultaneously obtained by the user in order to assess the global nature of the collection or to aid in decisions about what documents to pursue. Third, the order of encounter with documents in basic browsing is not optimized to satisfy users' information needs. In addition to exacerbating difficulties in simple information-seeking, these problems may also be found in the production and maintenance of large hypertext collections.

There are two widely visible technologies that may be considered broadly as seeking to address the above inefficiencies:

Text-based information retrieval techniques that rapidly evaluate the predicted relevance of documents to a user's topical query (e.g. services such as Alta Vista™, LycoS™, and Infoseek® which operate on the World Wide Web). This effectively changes slow sequential search to nearly parallel search, and provides an improved ordering of the users' search through documents.

Community/service categorization of documents. For instance, this service is provided by Yahoo™, which has a hierarchy of Web pages that define a topic taxonomy.

Known previous work has focused on attempts to extract higher level abstractions which can be used to improve navigation and assimilation of hypertext. Such work has typically used topological or textual relationships to drive analysis.

SUMMARY OF THE INVENTION

A system for analyzing the topology, content and usage of linked collections of documents such as those found on the World Wide Web (hereinafter the Web) to facilitate information searching or improving design of a web locality is disclosed. Documents found on the Web are typically referred to as Web pages. The system provides for (a) categorization based on feature vectors that characterize individual page information and (b) prediction of need (or relevance) of other Web pages with respect to a particular context, which could be a particular page or set of pages, using a spreading activation technique. In combination, these provide (from the user's perspective) nearly-parallel search, simultaneous identification of the types of all documents in a collection, and prediction of expected need. These techniques may be used in support of various information visualization techniques, such as the WebBook described in co-pending and commonly assigned application Ser. No. 08/525, 936 entitled "Display System For Displaying Lists of Linked Documents", to form and present larger aggregates of related Web pages. Categorization techniques are based on representations of Web pages as feature vectors containing information about document content, usage, and topology, as well as content, usage, and topology relations to other documents. These feature vectors are used to identify and rank particular kinds of Web pages, such as "organization home pages" or "index pages."

Spreading activation techniques are based on representations of Web pages as nodes in graph networks representing usage, content, and hypertext relations among Web pages. Conceptually, activation is pumped into one or more of the graph networks at nodes representing some starting set of Web pages (i.e. focal points) and it flows through the arcs of the graph structure, with the amount of flow modulated by the arc strengths (which might also be thought of as arc flow capacities). The asymptotic pattern of activation over nodes will define the degree of predicted relevance of Web pages to the starting set of Web pages. By selecting the topmost active nodes or those above some set criterion value, Web pages may be aggregated and/or ranked based on their predicted relevance.

BRIEF DESCRIPTION OF THE DRAWINGS

FIG. 5 is an illustration of a feature vector as may be utilized in the currently preferred embodiment of the present invention.

FIG. 6 is a table showing examples of categories and the corresponding feature weightings for the categories as may be utilized in the currently preferred embodiment of the present invention.

DETAILED DESCRIPTION OF THE INVENTION

Figure 1:
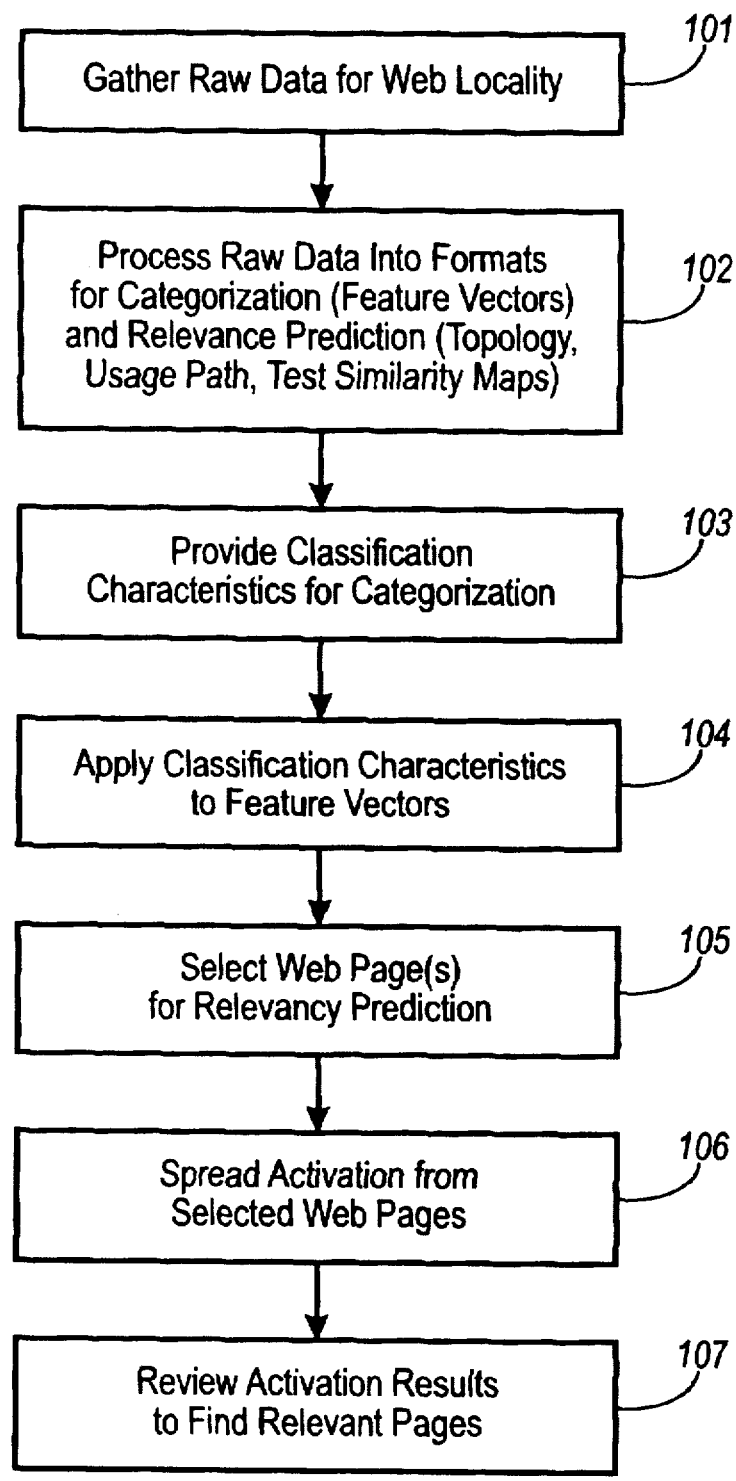
FIG. 1 is a flowchart illustrating the basic steps for web page categorization and relevance prediction as may be performed in the currently preferred embodiment of the present invention.

A system for analyzing the topology, content and usage of collections of linked documents is disclosed. The information derived from such a system may be used to aid a user in browsing the collection, redesigning the organization of the collection or in creating visualizations of the collections. The system provides a means for automatically categorizing the pages in the collection and a means for predicting the relevance of other pages in a collection with respect to a particular Web page using a spreading activation technique.

The currently preferred embodiment of the present invention is implemented for analyzing collections of linked documents residing on the portion of the Internet known as the World Wide Web (hereinafter the Web). However, it should be noted that the present invention is not limited to use on the Web and may be utilized in any system which provides access to linked entities, including documents, images, videos, audio, etc. The following terms defined herein are familiar to users of the Web and take on these familiar meanings:

World-Wide Web or Web: The portion of the Internet that is used to store and access linked documents.

Web Page or Page: A document accessible on the Web. A Page may have multi-media content as well as relative and absolute links to other pages.

Web Locality: A collection of related web pages associated with an entity having a site on the World-Wide Web such as a company, educational institute or the like.

Topology: The logical organization of web pages at a web locality as defined by links contained in the individual web pages.

Home Page: A page functioning as an entry point to a set of related pages on the Web. A home page will typically have a plurality of relative links to related pages.

Uniform Resource Locator (URL): The address or identifier for a page on the Web.

Server: An addressable storage device residing on the Internet which stores Web Pages.

Link: An indicator on a Web page which refers to another Web page and which can typically be retrieved in a point and click fashion. The Link will specify the URL of the other Web page.

Web Browser or Browser: A tool which enables a user to traverse through and view documents residing on the Web. Other rendering means associated with the Browser will permit listening to audio portions of a document or viewing video or image portions of a document.

Meta-information: Characteristic information for a particular Web page, including name, file size, number of links to pages in the Web locality, number of links to pages outside of the Web locality, depth of children, similarity to children, etc.

Overview

To best understand the context of the present invention, assume a scenario in which a user searches for relevant, valuable information at some web locality. The optimal selection of Web pages from the web locality to satisfy a user's information needs depends, in part, on the user's ability to rapidly categorize the Web page types, assess their prevalence on the web locality, assess their profitabilities (amount of value over cost of pursuit), and decide which categories to pursue and which to ignore. The overall rate of gaining useful information will be improved by eliminating irrelevant or low-value categories of information from consideration. Simply put, a user's precious time and attention benefits by being able to rapidly distinguish junk categories from important ones. This is improved by the degree to which Web pages can be quickly and simultaneously categorized.

Memory systems, whether human or machine, serve the purpose of providing useful information when it is needed. In part, the design of such systems is adaptive to the extent that they can reduce the costs of retrieving the information that is likely to be needed in a given context. This, for instance, is what memory caches and virtual memory attempt to optimize. For contexts involving human cognition, it has been argued that three general sorts of information determine the need probabilities of information in memory, given a current focus of attention: (1) past usage patterns, (2) degree of content shared with the focus, and (3) inter-memory associative link structures. The Web can be viewed as an external memory and a user would be aided by retrieval mechanisms that predicted and returned the most likely needed Web pages, given that the user has indicated an interest in a particular Web page in the Web locality.

In the present invention a kind of spreading activation mechanism is used to predict the needed Web page(s), computed using past usage patterns, degree of shared content, and the Web topology. The present invention utilizes techniques for inducing such information, and for approximating the computation of need probabilities using spreading activation. Also described is a way of pre-computing a base set of spreading activation patterns from which all possible patterns can be computed in a simple and efficient way (whose cost is proportional only to the number of activation sources involved in a retrieval).

The basic steps for categorizing web pages in a web locality and for predicting relevance of other pages of a selected page as may be performed in the currently preferred embodiment of the present invention are briefly described with reference to the flowchart in FIG. 1. First, raw data is gathered for the web locality, step 101. Such raw data may be obtained from usage records or access logs of the web locality and by direct traversal of the Web pages in the Web locality. As described below, "Agents" are used to collect such raw data. However, it should be noted that the described agents are not the only possible method for obtaining the raw data for the basic feature vectors. It is anticipated that Internet service providers have the capabilities to provide such raw data and may do so in the future.

In any event, the raw data is then processed into desired formats for performing the categorization (feature vectors) and relevance prediction (topology, usage path and text similarity maps), step 102. The raw data is comprised of topology information, page meta-information, page frequency path information and text similarity information. Topology information describes the hyperlink structure among Web pages at a Web locality. Page meta-information defines various features of the pages, such as file size and URL. Usage frequency and path information indicate how many times a Web page has been accessed and how many times a traversal was made from one Web page to another. Text similarity information provides an indication of the similarity of text among all text Web pages at a Web locality.

For the classification of Web pages in the web locality, classification characteristics are provided, step 103. The classification characteristics are predetermined "rules" which are applied to the feature vectors of a page to determine the category of the page. For example, it may be desirable to have a classification of web pages as index types (contain primarily links to other pages) or content types (contain primarily information). The classification characteristics are then applied to the feature vectors representing the Web pages, step 104. When the classification characteristics are applied to the respective feature vectors, lists of pages in the particular classes are created.

As noted above with respect to step 102, topology, usage path and text similarity maps of the web locality are generated from the raw data. These maps represent the strength of association among web pages in the locality. The topology map indicates the hyper link structure of the web locality and are used to perform the relevance prediction. The usage path map indicates the flow or paths taken during traversal of the web locality. The text similarity map indicates similarity of content between pages in the web locality. These maps are used perform the relevancy predictions.

For relevancy predictions, one or more Web pages for spreading activation are selected, step 105. The selected Web pages may be based on the category that it is in. Alternatively, if a user is currently browsing the pages in the web locality, the selected page may be the one currently being browsed. In any event, activation is spread using the selected page as a focal point to generate a list of relevant pages, step 106. Generally, activation is pumped into one or more of the maps at the selected Web pages and it flows through the arcs of the maps, with the amount of flow modulated by the arc strengths (which might also be thought of as arc flow capacities). Review activation results to find relevant pages, step 107. The asymptotic pattern of activation over nodes in the maps (i.e. Web pages) will define the degree of predicted relevance of Web pages to the selected set of Web pages. By selecting the topmost active Web pages or those above some set criterion value, Web pages may be ranked based on their predicted relevance. Subsequent traversal may then be performed based on the identified relevant Web pages.

Compiling the Raw Data for a Web Locality

Three basic kinds of raw data are extracted from a Web locality:

Topology and meta-information, which are the hyperlink structure among Web pages at a Web locality and various features of the pages, such as file size and URL.

Usage frequency and usage paths, which indicate how many times a Web page has been accessed and how many times a traversal was made from one Web page to another.

Text similarity among all text Web pages at a Web locality

As described mentioned above with respect to FIG. 1, the raw data is used to construct two types of representations:

Feature-vector representations of each Web page that represent the value of each page on each dimension and which are used in the categorization process Graph representations of the strength of association of Web pages to one another, which are used in the spreading activation. The graphs are represented using matrix formats.

Topology and Meta-information

Figure 2:
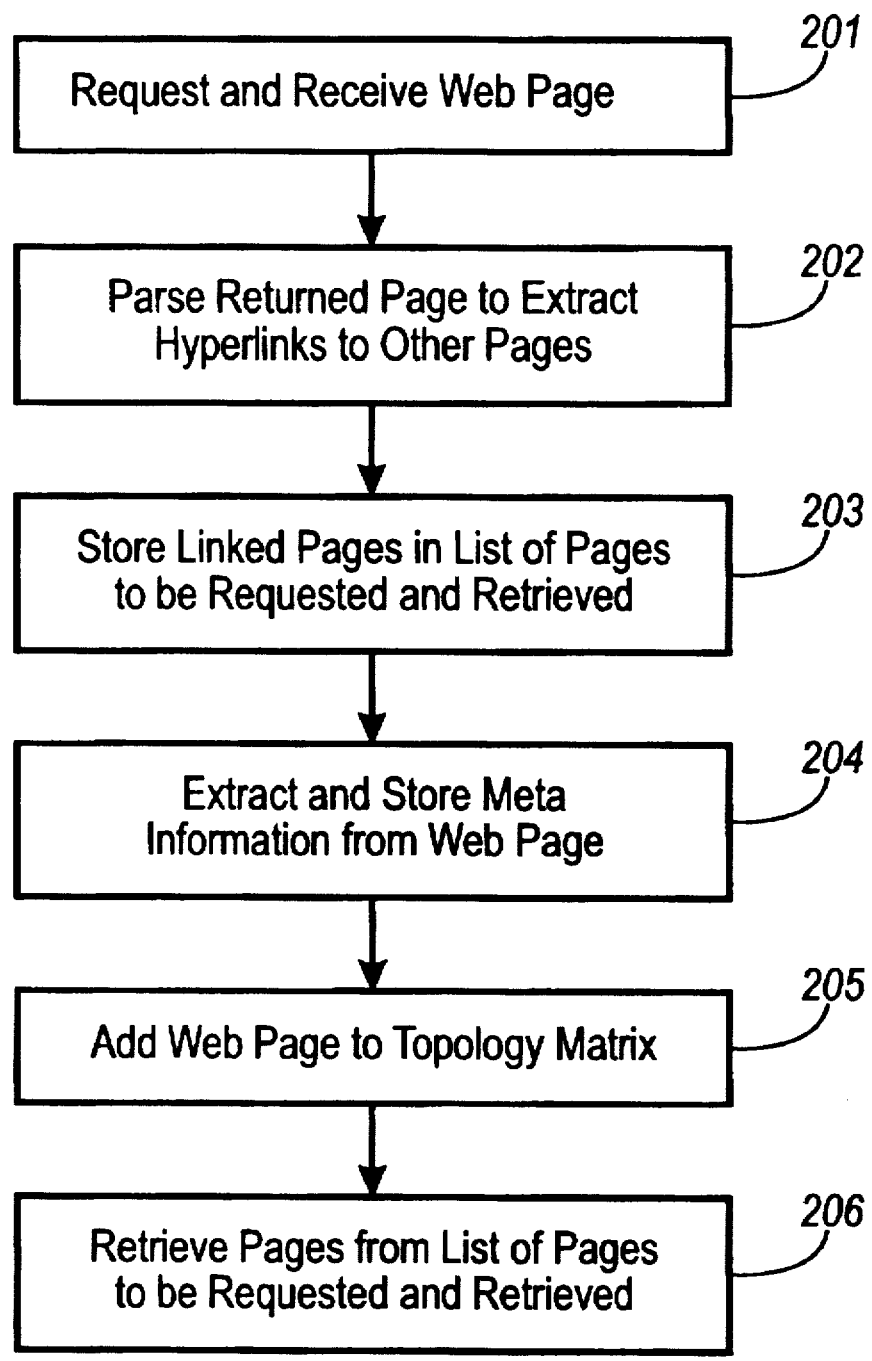
FIG. 2 is a flowchart illustrating the steps for obtaining the topology and meta-information for a web locality as may be performed in the currently preferred embodiment of the present invention.

The site's topology is ascertained via "the walker", an autonomous agent that, given a starting point, performs an exhaustive breadth-first traversal of pages within the Web locality. FIG. 2 is a flowchart illustrating the steps performed by the walker. Referring to FIG. 2, the walker uses the Hypertext Transfer Protocol (HTTP) to request and retrieve a web page, step 201. The walker may also be able to access the pages from the local filesystem, bypassing the HTTP. The returned page is then parsed to extract hyperlinks to other pages, step 202. Links that point to pages within the Web locality are added to a list of pages to request and retrieve, step 203. The meta-information for the page is also extracted and stored, step 204. The meta-information includes at least the following page meta-information: name, title, list of children (pages associated by hyperlinks), file size, and the time the page was last modified. The page is then added to a topology matrix, step 205. The topology matrix represents the page to page hypertext relations, and a set of meta-information called the meta-document vectors, which represents the meta-information for each Web page The list of pages to request and retrieve is then used to obtain the next page, step 206. The process then repeats per step 202 until all of the pages on the list have been retrieved.

Thus, the walker produces a graph representation of the hyperlink structure of the Web locality, with each node having at least the above described meta-information. It is salient to note that the walker may not have reached all nodes that are accessible via a particular server—only those nodes that were reachable from the starting point (e.g. a Home Page for the Web locality) are included. This can be alleviated by walking the local filesystem the locality resides on.

Usage Statistics, Usage Paths, and Entry Points

Most servers have the ability to record transactional information, i.e. access logs, about requested items. This information usually consists of at least the time and the name of the URL being requested as well as the machine name making the request. The latter field may represent only one user making requests from their local machine or it could represent a number of users whose requests are being issued through one machine, as is the case with firewalls and proxies. This makes differentiating the paths traversed by individual users from these access logs non-trivial, since numerous requests from proxied and firewalled domains can occur simultaneously. That is, if 200 users from behind a proxy are simultaneously navigating the pages within a site, how does one determine which users took which paths? This problem is further complicated by local caches maintained by each browser and intentional reloading of pages by the user.

Figure 3:
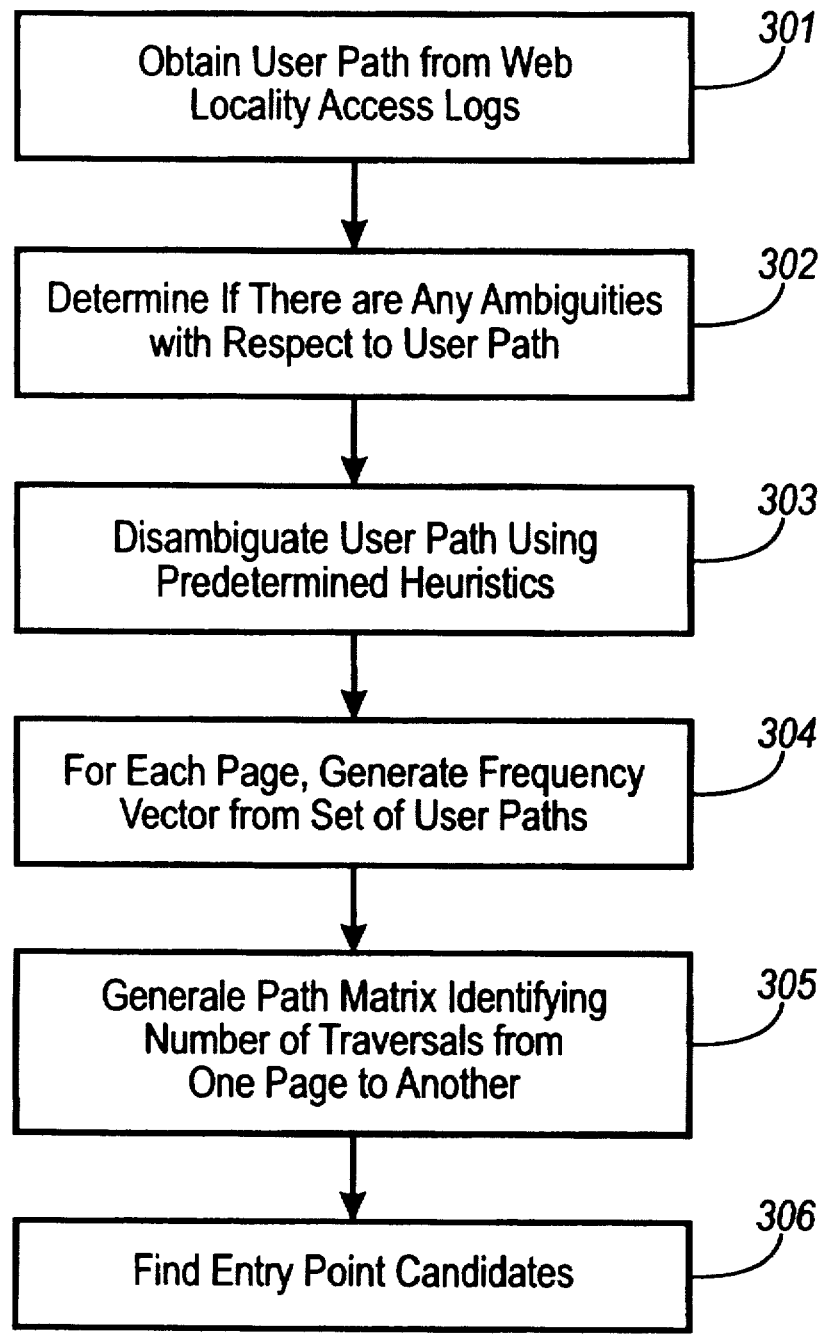
FIG. 3 is a flowchart illustrating the steps for obtaining usage statistics, usage path and entry point information as may be performed in the currently preferred embodiment of the present invention.

The technique implemented to determine user's paths, a.k.a. "the whitter", utilizes the Web locality's topology along with several heuristics. FIG. 3 is a flowchart illustrating the steps performed to determine user paths. First, a user path is obtained from the web locality access logs, step 301. The topology matrix is consulted to determine legitimate traversals. It is then determined if there are any ambiguities with respect to the user path, step 302. As described above such ambiguities may arise in the situation where the request is from a proxied or firewalled domain. If an ambiguity is suspected, predetermined heuristics are used to disambiguate user paths, step 303. The heuristics used relies upon a least recently used bin packing strategy and session length time-outs as determined empirically from end-user navigation patterns. Essentially, new paths are created for a machine name when the time between the last request and the current request was greater than the session boundary limit, i.e., the session timed out. New paths are also created when the requested page is not connected to the last page in the currently maintained path. These tests are performed on all paths being maintained for that machine name, with the ordering of tests being the paths least recently extended. The foregoing analysis produces a set of paths requested by each machine and the times for each request.

From the set of paths, a vector that contains each page's frequency of requests is generated (i.e. a frequency vector), step 304, along with a path matrix containing the number of traversals from one page to another, step 305. In the currently preferred embodiment, the matrix is computed using software that identifies the frequency of all substring combinations for all paths.

Additionally, the difference between the total number of requests for a page and the sum of the paths to the page is computed to generate a set of entry point candidates, step 306. The entry point candidates are the Web pages at a Web locality that seem to be the starting points for many users. Entry points are defined as the set of pages that are pointed to by sources outside the locality, e.g. an organization's home page, a popular news article, etc. Entry points might provide useful insight to Web designers based on actual use, which may differ from their intended use on a Web locality. Entry points also may be used in providing a set of nodes from which to spread activation.

Inter-document Text Similarity

Techniques from information retrieval can be applied to calculate a text similarity matrix which represents the inter-document text similarities among Web pages. In particular, for each Web page, the text is tokenized and indexed using a statistical content analysis process. An SCA engine processes text Web pages by treating their contents as a sequence of tokens and gathering collection and document level object and token statistics (most notably token occurrence). A contiguous character string representing a word is an example of a token. So in the currently preferred embodiment of the present invention, the Web pages in a Web locality are processed by the SCA engine to yield various indexes and index terms. A suitable process for analysis and tokenization of a collection of documents (or database) is described in section 5 of a publication entitled "An Object-Oriented Architecture for Text Retrieval", Doug Cutting, Jan Pedersen, and Per-Kristian Halvorsen, Xerox PARC technical report SSL-90-83.

Figure 4:
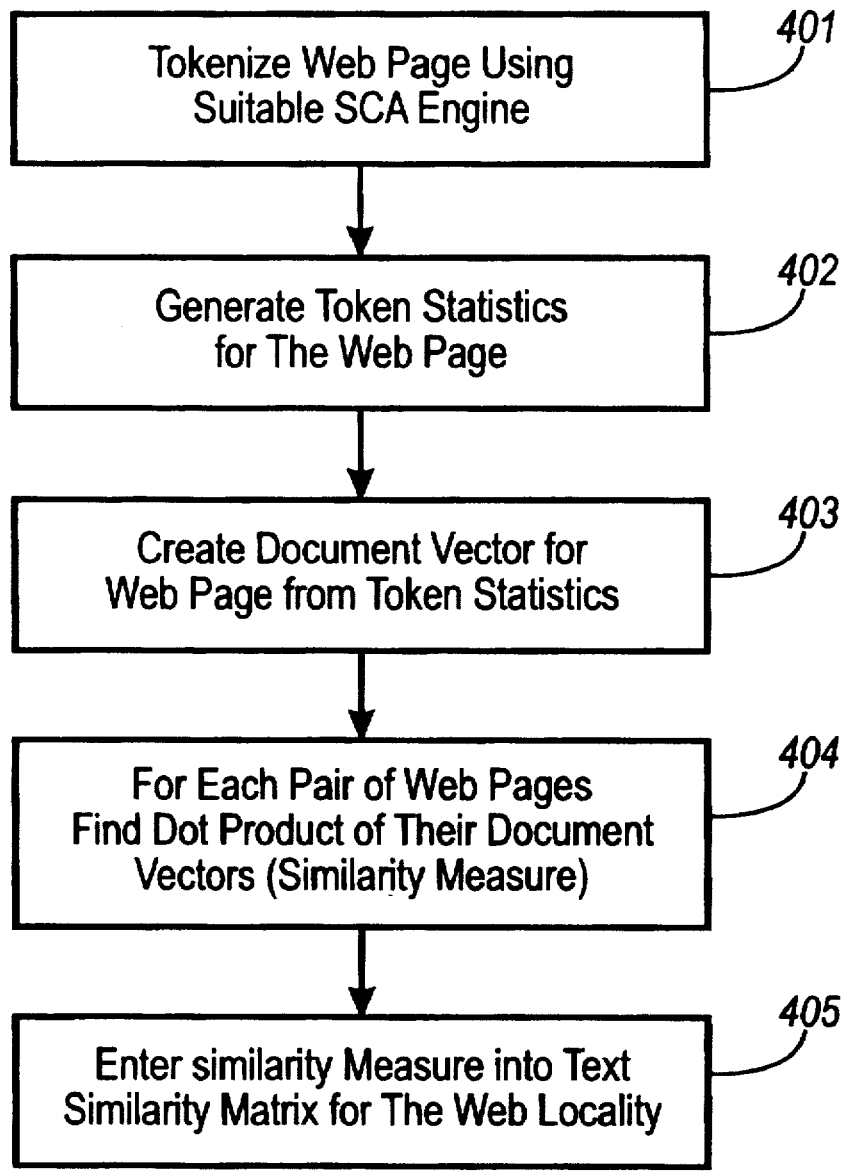
FIG. 4 is a flowchart for calculating a text similarity matrix as may be performed in the currently preferred embodiment of the present invention.

FIG. 4 is a flowchart describing the steps for generating a text similarity matrix. Referring to FIG. 4, a suitable SCA engine is used to tokenize a web page, step 401. Token statistics for the web page are then generated, step 402. These statistics include token occurrence. The token information is then used to create a document vector, where each component of the vector represents a word, step 403. Entries in the vector for a document indicate the presence or frequency of a word in the document. The steps 401–403 are repeated for each Web page in the Web locality. For each pair of pages, the dot product of these vectors is computed, step 404. The dot product which produces a similarity measure. The similarity measure is then entered into the appropriate location of the text similarity matrix for the Web locality, step 405.

The currently preferred embodiment further provides a method for computing a "desirability" index for each Web page that "ages" over time. Using this, one can predict the number of hits a page will receive. What may also be provided is a "life-change" index, that also "ages" over time, that predicts the likelihood of Web pages being altered.

Categorization of Web Pages

In order to perform categorizations each Web page at the Web locality is represented by a vector of features constructed from the above topology, metainformation, usage statistics and paths, and text similarities. These Web page vectors are collected into a matrix. Such a matrix is illustrated in FIG. 5. Referring to FIG. 5, each row 501 of the matrix 500 represents a Web page. The columns in matrix 500 represent a the page's:

page identifier, identifies the particular web page (column 502)

size, in bytes, of the item (column 503)

inlinks, the number of hyperlinks that point to the item from the web locality (column 504).

outlinks, the number of hyperlinks the item contains that point to other items in the web locality (column 505).

frequency, the number of times the item was requested in the sample period (column 506).

sources, number of times the item was identified as the start of a path traversal (column 507).

csim, the textual similarity of the item to it's children based upon previous SCA calculation (column 508).

cdepth, the average depth of the item's children as measured by the number of '/' in the URL (column 509). Note that the means and distributions of the feature values are normalized.

The present invention assumes that categories are designed by someone (application designer, webmaster, end user), in contrast to being automatically induced. These categories might be, for instance, socially defined genres (personal home page; product description), or personally defined categories of interest.

The present invention utilizes an approach based on weighted linear equations that define the rules for predicting degree of category membership for each page at a web locality. That is, equations are of the form $$c_j = w_1 v_1 + w_2 v_2 + \ldots + w_n v_n$$

for all pages i in a Web locality, where the vj are the measured features of each Web page, and the wj are weights.

Example of Categories

Categorization techniques typically attempt to assign individual elements into categories based on the features they exhibit. Based on category membership, a user may quickly predict the functionality of an element. For instance, in the everyday world, identifying something as a "chair" enables the quick prediction that an object can be sat on. The techniques described herein will thus rely on the particular features that can be extracted about Web pages at a Web locality.

One may conceive of a Web locality as a complex abstract space in which are arranged Web pages of different functional categories or types. These functional categories might be defined by a user's specific set of interests, or the categories might be extracted from the collection itself through inductive technologies (e.g. Scatter/Gather techniques as described by Cutting, et al. in a publication entitled "Scatter/gather: A cluster-based approach to browsing large document collections", *Proceedings of SIGIR'92*, Jun. 1992.). An example category might be organizational home page. Typical members of the category would describe an organization and have links to many other Web pages, providing relevant information about the organization, its divisions or departments, summaries of its purpose, and so on.

In the currently preferred embodiment, a set of functional categories is defined. Each functional category was defined in a manner that has a graded membership, with some pages being more typical of a category than others, and Web pages may belong to many categories. FIG. 6 is a table illustrating the Web categories defined in the currently preferred embodiment of the present invention:

head 601: Typically a related set of pages will have one page that would best serve as the first one to visit. Head pages have two subclasses:

organizational home page 602: These are pages that represent the entry point for organizations and institutions, usually found as the default home page for servers, e.g., http://www.org/ personal home page 603: Usually, individuals have only one page within an organization that they place personal information and other tidbits on.

index 604: These are pages that server to navigate users to a number of other pages that may or may not be related. Typical pages in this category have the words "Index" or "Table of Contents" or "toc" as part of their URL.

source index 605: These pages are also head nodes, those that are used as entry points and indices into a related information space.

reference 606: A page that is used to repeatedly explain a concept or contains actual references. References also have a special subclasses:

destination reference 607: In graph theory these are best thought of as "sinks", pages that do not point elsewhere but that a number of other pages point to. Examples include pages of expanded acronyms, copyright notices, and bibliographic references.

content 608: These are pages whose purpose is not to facilitate navigation, but to deliver information.

FIG. 6 further shows the weights used to order Web pages for each of the categories outlined above. For example, it is hypothesized that Content Pages would have few inlinks and few outlinks, but have relatively larger file sizes. So the content classification criteria 608 used to determine this category of pages had a positive weight, +1, and negative weight, −1, on the inlink and outlink features. For Head Nodes (classification criteria 601), being the first pages of a collection of documents with like content, it is expected that such pages will have high text similarity between itself and its children, and would have a high average depth of its children, and that it would be more likely to be an entry point based upon actual user navigation patterns.

It is noted that sometimes categories are formed which cannot be captured by such rules (i.e., the rules assume linearly separable categories and people sometimes form categories that are not linearly separable). However, the approach of the currently preferred embodiment has the advantage of being easy to compute and having simple combinatorics. This means that (a) the rules could be easily defined by the average end-user, (b) that membership in all core categories can be precomputed and stored as another feature on the feature vector (a computed feature as opposed to a basic feature) and (c) membership in a mixture of categories is just another weighted linear equation in which the features are categories.

Relevance Prediction Through Spreading Activation

With the above information, various predictions can be made as to pages relevant to a particular page. The "spreading activation" technique is used to make such a prediction.

Spreading activation can be characterized as a process that identifies knowledge predicted to be relevant to some focus of attention.

As noted above, the raw data provided by the web agents are massaged into three matrix structures representing the (a) link topology, (b) usage flow, and (c) interpage text similarity. The spreading activation technique used for relevance prediction assumes that one may identify a pattern of input activation that represents a pattern or focus of attention. For instance, the focus may be a specific Web page or a prototype of a category. Activation from this focus point(s) spreads through one or more of the three graphs and eventually settles into a stable pattern of activation across all nodes. The activation values are assumed to be the predicted relevance to the input focus (or the probability that a page will be needed given the pages in the input focus).

Figure 7:
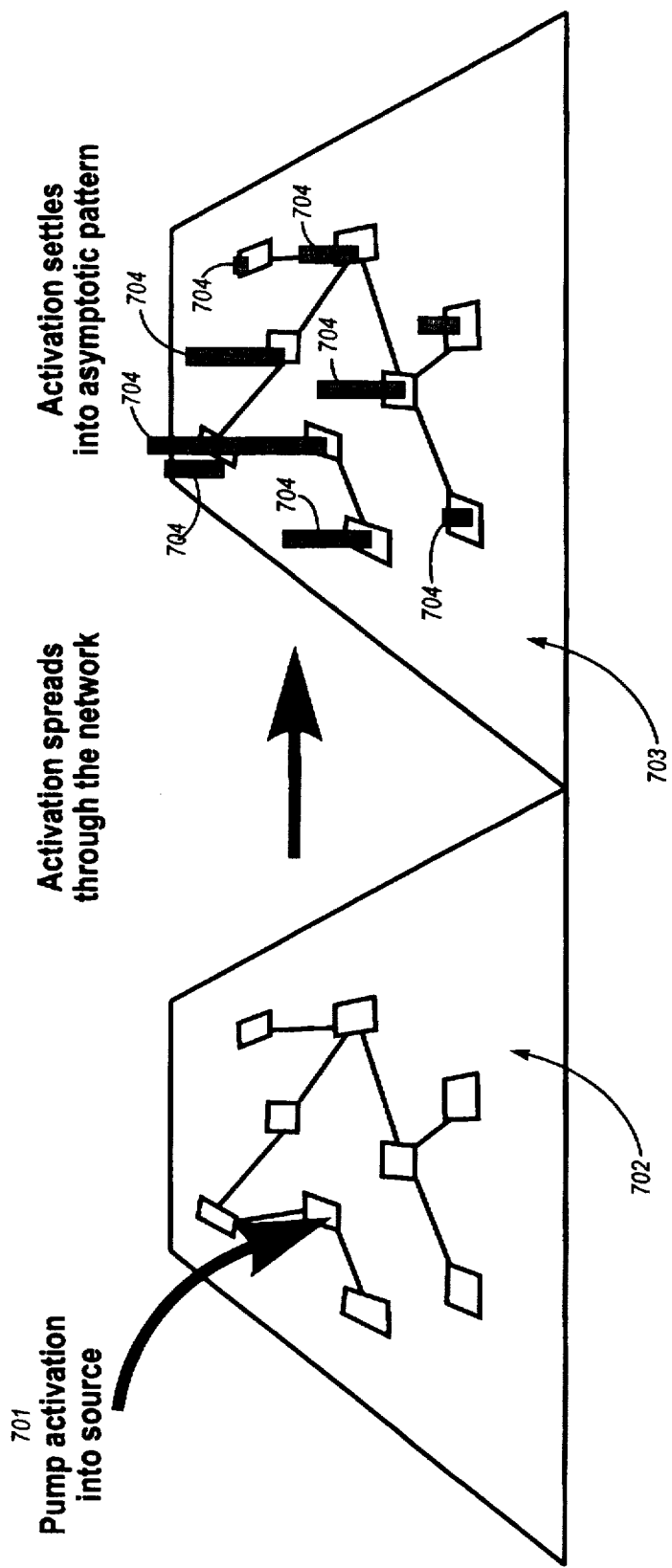
FIG. 7 is a diagram illustrating the concept of spreading activation, as may be utilized in the currently preferred embodiment of the present invention.

Spreading activation across the networks is described conceptually with reference to FIG. 7. Referring to FIG. 7, activation 701 is pumped into one or more of the graph networks 702 at nodes representing some starting set of focus Web pages. The activation flows through the arcs of the graph structure, with the amount of flow modulated by the arc strengths (which might also be thought of as arc flow capacities). The asymptotic pattern of activation over nodes, as illustrated by bars 704 contained in the nodes at activated network 703, will define the degree of predicted relevance of Web pages to the starting set of focus Web pages. By selecting the topmost active nodes or those above some set criterion value, Web pages are extracted and ranked based on their predicted relevance.

The particular technique described has the property that the activation patterns that result from multiple input sources are just additive combinations of the activation patterns produced by each of the sources individually (multiple weighted sources are just weighted additions of the individual sources). Using this property, one may precompute the activation patterns that arise from each source combined with each graph. All complex patterns can be derived from these by simple vector addition. In addition, the activation values arising in each activation pattern can be combined with the categorization values.

In the currently preferred embodiment, the activation spreading technique used is a leaky capacitor model described by J. R. Anderson and P. L. Pirolli, in "Spread of Activation", *Journal of Experimental Psychology: Learning, Memory, and Cognition*, pp. 791–798 (1984) and by Huberman, B. A. and T. Hogg, in "Phase Transitions In Artificial Intelligence Systems", *Artificial Intelligences*, pp. 155–171(1987).

Networks for Spreading Activation

As outlined above, three kind of graphs, or networks, are used to represent strength of associations among Web pages: (1) the hypetext link topology of a Web locality, (2) interpage text similarity, and (3) the usage paths, or flow of users through the locality. Each of these networks or graphs is represented by matrices in our spreading activation algorithm. That is, each row corresponds to a network node representing a Web page, and similarly each column corresponds to a network node representing a Web page. If we index the 1, 2, . . . , N Web pages, there would be i=1, 2, . . . N columns and j=1, 2, . . . N rows for each matrix representing a graph network.

Each entry in the $i^{th}$ column and $j^{th}$ row of a matrix represents the strength of connection between page i and page j (or similarly, the amount of potential activation flow or capacity). The meaning of these entries varies depending on the type of network through which activation is being spread.

Figures 8, 9:
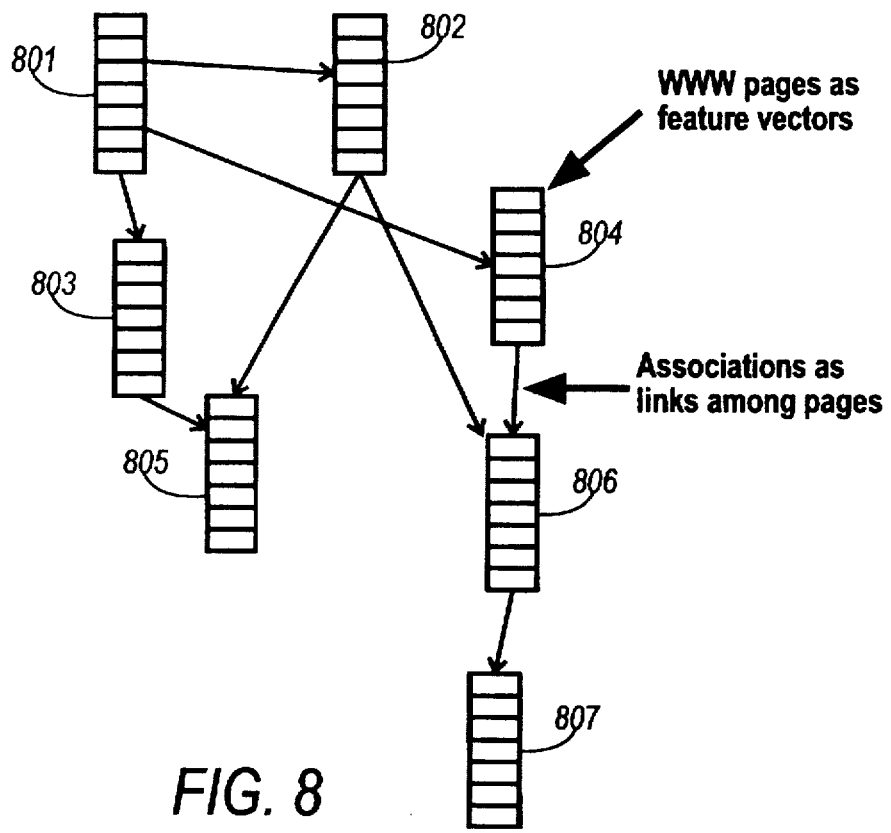
FIG. 8 is an illustration of a topology network for a Web locality.
FIG. 9 is an illustration of a matrix representation of the topology network of FIG. 8.

FIGS. 8-9 illustrate a topology network for a Web locality and the corresponding matrix representation. Referring to FIG. 8, each node or Web page is represented as feature vectors 801-807. The arcs in the graph indicate links between the various pages. Referring now to FIG. 9, for the matrix representation in topology networks, an entry of 0 in column i, row j, indicates no hypertext link between page i and page j, whereas an entry of 1 indicates a hypertext link. So for example, Web page 801 is seen to have links to pages 802-804 by the entry of 1 in the corresponding positions of the topology matrix.

Figures 10, 11:
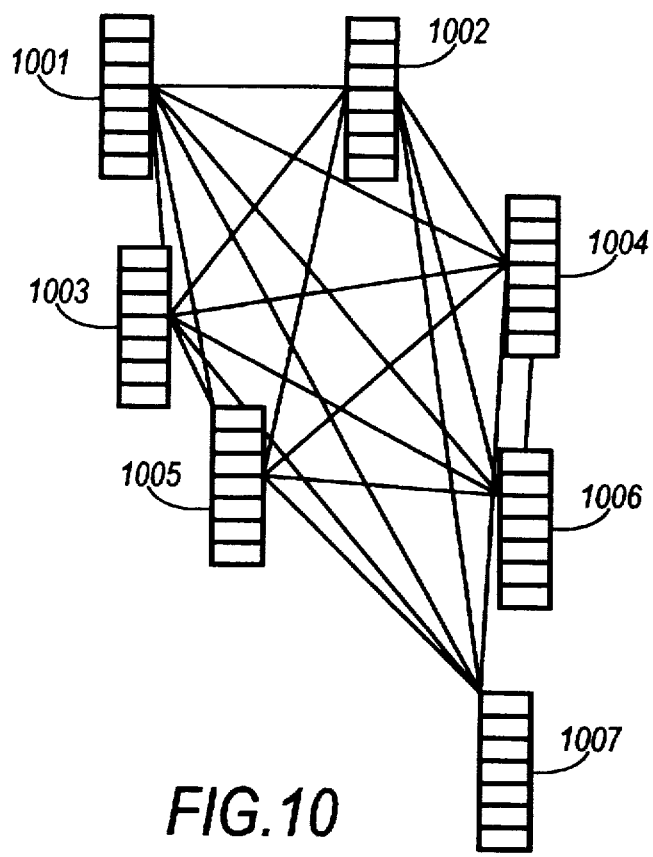
FIG. 10 is an illustration of a text similarity network for a Web locality.
FIG. 11 is an illustration of a matrix representation of the text similarity network of FIG. 10.

FIGS. 10-11 illustrate a text similarity network and corresponding matrix representation. Referring to FIG. 10, the widths of the lines connecting the various pages 1001-1007 is an indication of how similar the pages are. Referring now to FIG. 11, for the matrix representation of text similarity networks, an entry of a real number, s>=0, in column i, row j indicates the inter-document similarity of page i to page j.

Figures 12, 13:
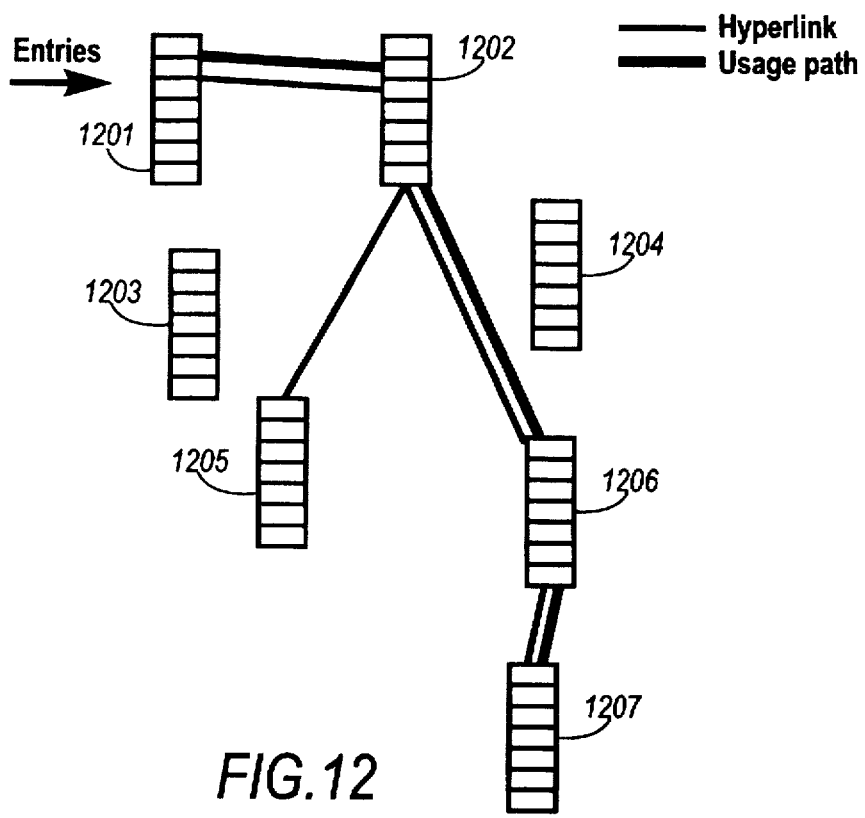
FIG. 12 is an illustration of a usage path network for a Web locality.
FIG. 13 is an illustration of a matrix representation of the usage path network of FIG. 12.

FIGS. 12-13 illustrate usage path network and corresponding matrix representation. Referring to FIG. 12, it should be noted that there will only be usage between nodes where there are corresponding links. So illustrated on FIG. 12 are both links and the usage path. Referring now to FIG. 13, for the matrix representation of usage path networks, an entry of an integer strength, s>=0, in column i row j, indicates the number of users that traversed from page i to page j.

Activation

An activation network can be represented as a graph defined by matrix R, where each off-diagonal element $R_{i,j}$ contains the strength of association between nodes i and j, and the diagonal contains zeros. The strengths determine how much activation flows from node to node. The set of source nodes of activation being pumped into the network is represented by a vector C, where $C_i$ represents the activation pumped in by node i. The dynamics of activation can be modeled over discrete steps t=1, 2, ... N, with activation at step t represented by a vector A(t), with element A(t, i) representing the activation at node i at step t. The time evolution of the flow of activation is termined by $$A(t)=C+M\,A(t-1) \qquad \text{Equation 2}$$

where M is a matrix that determines the flow and decay of activation among nodes. It is specified by $$M=(1-g)I+a\,R, \qquad \text{Equation 3}$$

where g<1 is a parameter determining the relaxation of node activity back to zero when it receives no additional activation input, and a is a parameter denoting the amount of activation spread from a node to its neighbors. I is the identity matrix.

Example 1

Predicting the Interests of Home Page Visitors

To illustrate, consider the situation in which it is desirable to identify the most frequently visited organization home page using the categorization information, and construct a Web aggregate that contains the pages most visited from that page. The most popular organization page can be identified by first finding the pages in that category using the classification criteria described in FIG. 6 (i.e. the "Organization Home Page" criteria). The most popular page would then be the identified page having the highest "frequency" value in their corresponding document vector. To find the most visited page through spreading activation, the corresponding component of C given a positive value, and the remaining elements set to zero. Setting the association matrix R to be the usage path matrix, Equation 2 above is iterated for N time steps (e.g. N=10 has provided acceptable results). The most visited pages are then those having the highest activation. Alternatively, the most visited pages may be those that exceed some predetermined activation threshold. In any event, a Web aggregate has been identified.

Based on this information traversal patterns can be determined which identify the most popular types of information requested. So an external user entering a companies home page may be looking at the companies products or financial reports. This may give a profile that the typical person examining the Web locality are potential customers or investors.

Example 2

Assessing the Typical Web Author at a Locality

Consider another situation in which the Web pages of interest are those having the highest text similarity to the most typical person page in a Web locality. In other words, one might be interested in understanding something about what a typical person publishing in a Web locality says about themselves. In this case, the most typical person page is identified using the "Personal Home Page" Criteria described in FIG. 6, the corresponding C element set to positive activation input (zeros elsewhere), and R is set to the text similarity matrix. Iteration of this spread of activation for N=10 time steps selects a collection of Web pages. By reading the group project overviews, the home pages of related people, personal interest pages, and formal and informal groups to which the person belongs, one may get some sense of what people are like in the organization.

Combining Activation Nets

Because of the simple properties of the activation networks, it is easy to combine the spread of activation though any weighted combination of activation pumped from different sources and through different kinds of arc--that is, simultaneously through the topology, usage, and text similarity connections. Consequently, the Web locality can be lit up from different directions and using different colors of predicted relevancy. For instance one might be interested in the identifying the pages most similar in content to the pages most popularly traversed.

Visualizations

Most current Web browsers provide very little support for helping people gain an overall assessment of the structure and content of large collections of Web pages. Information Visualization could be used to provide an interactive overview of web localities that facilitates navigation and general assessment. Visualizations have been developed that provide new interactive mechanisms for making sense of information sets with thousands of objects. The general approach is to map properties and relations of large collections of objects onto visual, interactive structures.

To the extent that the properties that help users navigate around the space and remember locations or ones that support the unit tasks of the user's work, the visualizations provide value to the user. Visualizations can be applied to the Web by treating the pages of the Web as objects with properties. Each of these visualizations provide an overview of a Web locality in terms of some simple property of the pages. For example, the present invention may be used in support of information visualization techniques, such as the WebBook described in co-pending and commonly assigned application Ser. No. 08/525,936 entitled "Display System For Displaying Lists of Linked Documents", to form and present larger aggregates of related Web pages. Other examples include a Cone Tree which shows the connectivity structure between pages and a Perspective Wall which shows time-indexed accesses of the pages. The cone tree is described in U.S. Pat. No. 5,295,243 entitled "Display of Hierarchical Three-Dimensional Structures With Rotating Substructures". The Perspective Wall is described in U.S. Pat. No. 5,339,390 entitled "Operating A Processor To Display Stretched Continuation Of A Workspace". Thus, these visualizations are based on one or a few characteristics of the pages.

Figure 14:
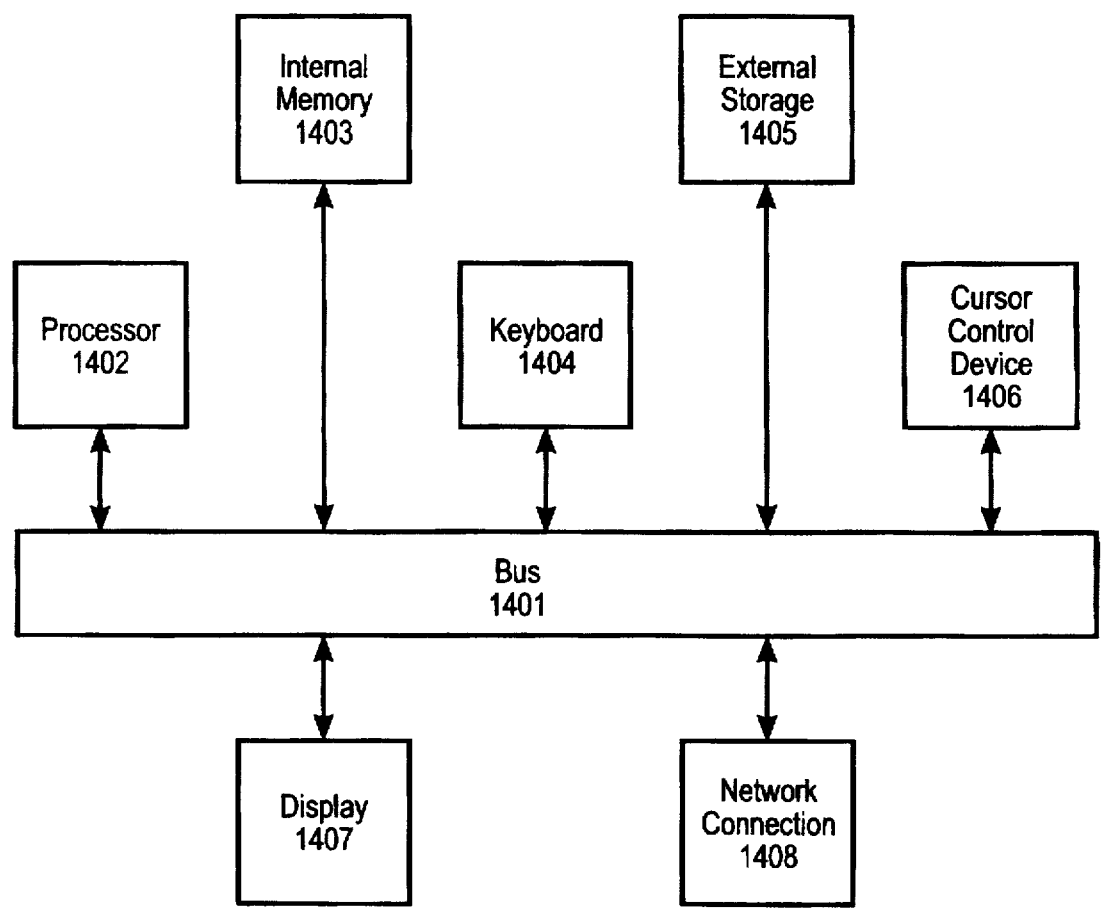
FIG. 14 is a block diagram illustrating the basic components of a computer based system as may be used to implement the currently preferred embodiment of the present invention.

Overview of a Computer Controlled Display System in the Currently Preferred Embodiment of the Present Invention The computer based system on which the currently preferred embodiment of the present invention may be implemented is described with reference to FIG. 14. The computer based system and associated operating instructions (e.g. software) embody circuitry used to implement the present invention. Referring to FIG. 14, the computer based system is comprised of a plurality of components coupled via a bus 1401. The bus 1401 may consist of a plurality of parallel buses (e.g. address, data and status buses) as well as a hierarchy of buses (e.g. a processor bus, a local bus and an I/O bus). In any event, the computer system is further comprised of a processor 1402 for executing instructions provided via bus 1401 from Internal memory 1403 (note that the Internal memory 1403 is typically a combination of Random Access and Read Only Memories). The processor 1402 will be used to perform various operations in support extracting raw data from web localities, converting the raw data into the desired feature vectors and topology, usage path and text similarity matrices, categorization and spreading activation. Instructions for performing such operations are retrieved from Internal memory 1403. Such operations that would be performed by the processor 1402 would include the processing steps described in FIGS. 1–4 and 7. The operations would typically be provided in the form of coded instructions in a suitable programming language using wellknown programming techniques. The processor 1402 and Internal memory 1403 may be discrete components or a single integrated device such as an Application Specification Integrated Circuit (ASIC) chip.

Also coupled to the bus 1401 are a keyboard 1404 for entering -alphanumeric input, external storage 1405 for storing data, a cursor control device 1406 for manipulating a cursor, a display 1407 for displaying visual output (e.g. the WebBook) and a network connection 1408. The keyboard 1404 would typically be a standard QWERTY keyboard but may also be telephone like keypad. The external storage 1405 may be fixed or removable magnetic or optical disk drive. The cursor control device 1406, e.g. a mouse or trackball, will typically have a button or switch associated with it to which the performance of certain functions can be programmed. The network connection 1408 provides means for attaching to a network, e.g. a Local Area Network (LAN) card or modem card with appropriate software. The network ultimately attached to is the Internet, but it may be through intermediary networks or On-Line services such as America On-Line, Prodigy ™ or CompuServ ™.

Thus, a system for analyzing a collection of hyper-linked pages is disclosed. While the present invention is described with respect to a preferred embodiment, it would be apparent to one skilled in the art to practice the present invention with other configurations of digital document management systems. Such alternate embodiments would not cause departure from the spirit and scope of the present invention. For example, the present invention may be implemented as software instructions residing on a suitable memory medium for use in operating a computer based system.

What is claimed is:

1. A system for categorizing documents contained in a linked collection of documents comprising:

means for obtaining raw data from said linked collection of documents, said raw data including meta information for documents in said linked collection of documents;

means for creating a feature vector for documents in said linked collection of documents from said raw data, said feature vector comprising a plurality of elements;

means for defining classification criteria indicating particular categories of document types, said classification criteria comprising user defined weightings of the elements for said feature vector and a corresponding class threshold value;

processing means for applying said classification criteria to feature vectors to determine if a document is in a corresponding category.

2. The system as recited in claim 1 wherein said means for obtaining raw data for said linked collection of documents is further comprised of a first agent for traversing said linked collection of documents to obtain topology information and document meta information.

3. The system as recited in claim 2 wherein the plurality of elements of a feature vector for a document in said linked collection of documents include:

size information for said document;

inlink information for said document, said inlink information indicating the number of links in said linked collection of documents that point to said document;

outlink information for said document, said outlink information indicating the number of links the document contains to other documents said linked collection of documents;

frequency information for said document, said frequency information indicating the number of times said document was requested during a sample period;

source information for said document, said source information indicating the number of times said document was identified as the start of a path traversal;

text similarity information for said document, said text similarity information indicating the similarity of the text of the document to documents in said linked collection of document to which they are linked; and depth information for said document, said depth information indicating the average depth in said linked collection of documents of documents to which said document links.

4. The system as recited in claim 3 wherein said processing is comprised of means for determining that a document is a class if after applying said classification criteria the result exceeds said corresponding class threshold value.

5. The system as recited in claim 1 wherein said linked collection of documents is a Web locality.

6. A method for generating a list of web pages in a web locality that are contained in a user defined class comprising the steps of:

a) obtaining raw data for said web locality, said raw data including topology information and web locality usage information;

b) generating page meta data for each web page in said web locality from said raw data;

c) generating feature vectors for each web page in said web locality using said page meta data and said topology information, said feature vector comprised of a plurality of elements;

d) obtaining a classification criteria for determining if a web page is a member of a category of web pages, said classification criteria comprising user defined weightings of the plurality of elements for said feature vector and a corresponding class threshold value; and e) applying said classification criteria to said feature vectors to obtain a list of pages in said category.

7. The method as recited in claim 6 wherein said step of obtaining topology information for said web locality is comprised of the steps of:

a1) retrieving a web page;

a2) storing location information for said web page;

a3) parsing said web page to identify links to other web pages; and a4) repeating steps a1)–a3) for each of said other web pages.

8. The method as recited in claim 6 wherein said step of obtaining page meta data for each web page in said web locality is further comprised of the step of collecting page meta data for a page as the page is retrieved.

9. The method as recited in claim 6 wherein said step of generating feature vectors for each web page in said web locality using said page meta data and said topology information is further comprised of the step of for each associated web page in said web locality performing the steps of:

extracting size information for said associated web page and storing as a size element in said corresponding feature vector;

extracting inlink information for said associated web page, said inlink information indicating the number of links in said web locality that point to said associated web page as storing as an inlink element in said corresponding feature vector;

extracting outlink information for said associated web page, said outlink information indicating the number of links the web page contains to other web pages in said web locality and storing as an outlink element in said corresponding feature vector;

extracting frequency information for said associated web page, said frequency information indicating the number of times said associated web page was requested during a sample period and storing as a frequency element in said corresponding feature vector;

extracting source information for said associated web page, said source information indicating the number of times said associated web page was identified as the start of a path traversal and storing as a source element in said corresponding feature vector;

extracting text similarity information for said associated web page, said itext similarity information indicating the similarity of the text of the associated web page to other web pages in said web locality to which they are linked and storing as a text similarity element in said corresponding feature vector; and extracting depth information for said associated web page, said depth information indicating the average depth in said web locality of other web pages to which said associated web page links and storing as a depth element in said corresponding feature vector.

10. The method as recited in claim 9 wherein said step of applying said classification criteria to said feature vectors to obtain a list of pages in said category is further comprised of the steps of:

for each element of a feature vector applying a corresponding weighting value to obtain a feature value;

summing the resulting values feature values; and comparing said sum to said class threshold value to determine if said corresponding page is in said class.

11. A system for generating characteristic data for a linked collection of documents comprising:

means for obtaining raw data for said linked collection of documents, said raw data including usage data, topology data and content data;

means for creating a feature vector for each document in said linked collection of documents from said raw data; and means for categorizing each of said documents in said linked collection of documents according to predetermined classification criteria, said predetermined classification criteria comprising user defined weightings of the elements for said feature vector and a corresponding class threshold value.

12. The system as recited in claim 11 further comprising:

means for creating usage, topology and text similarity maps for said linked collection of documents from said raw data;

means for predicting a relevant set of documents for a subset of said linked collection of documents using one or more of said usage, topology and text similarity maps.

13. A system for categorizing documents contained in a linked collection of documents comprising:

means for obtaining raw data from said linked collection of documents, said raw data including meta information for documents in said linked collection of documents;

means for creating a feature vector for documents in said linked collection of documents from said raw data, said feature vector having at least one element indicating a frequency of request for an associated document;

means for defining classification criteria indicating particular categories of document types;

processing means for applying said classification criteria to feature vectors to determine if a document is in a corresponding category.

14. A method for generating a list of web pages in a web locality that are contained in a user defined class comprising the steps of:

a) obtaining raw data for said web locality, said raw data including topology information and web locality usage information;

b) generating page meta data for each web page in said web locality from said raw data, said meta data including data indicating a frequency of request for an associated document;

c) generating feature vectors for each web page in said web locality using said page meta data and said topology information;

d) obtaining a classification criteria for determining if a web page is a member of a category of web pages; and e) applying said classification criteria to said feature vectors to obtain a list of pages in said category.

\* \* \* \* \*